March 18, 1958 D. FRAZIER 2,827,172
THERMAL DIFFUSION METHOD AND APPARATUS
Filed June 20, 1956 2 Sheets-Sheet 1

INVENTOR.
DAVID FRAZIER
BY
his ATTORNEY

March 18, 1958 D. FRAZIER 2,827,172
THERMAL DIFFUSION METHOD AND APPARATUS
Filed June 20, 1956 2 Sheets—Sheet 2
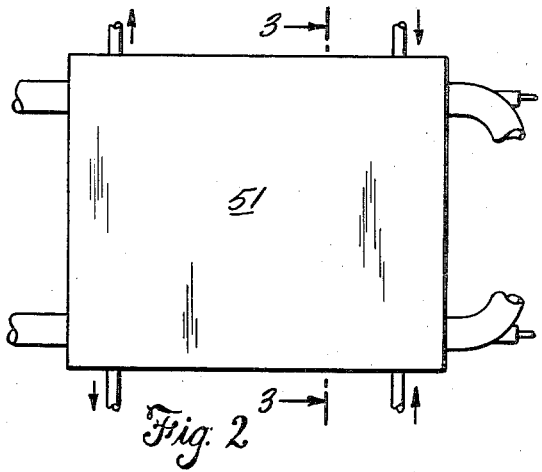
Fig. 2
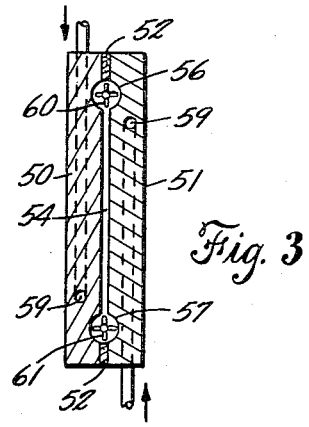
Fig. 3
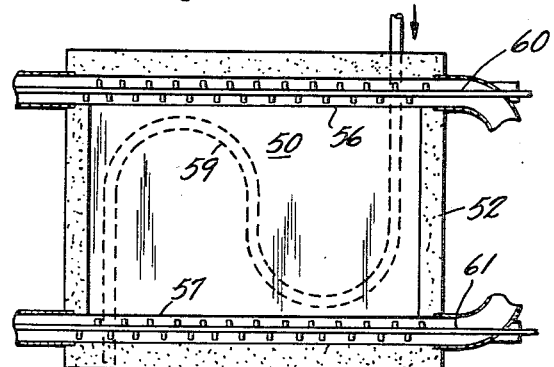
Fig. 4
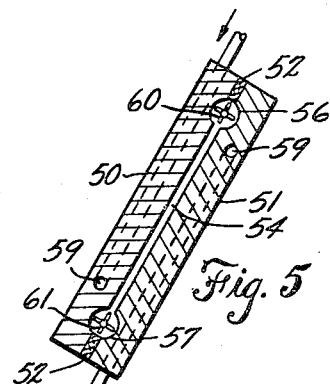
Fig. 5
Fig. 7
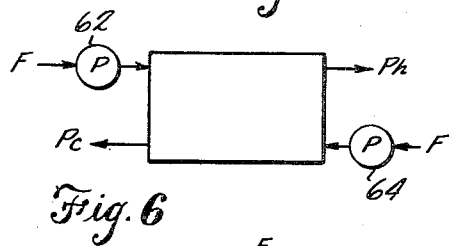
Fig. 6
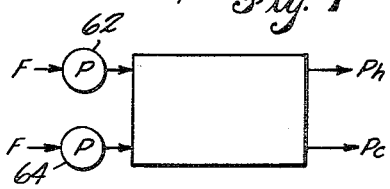
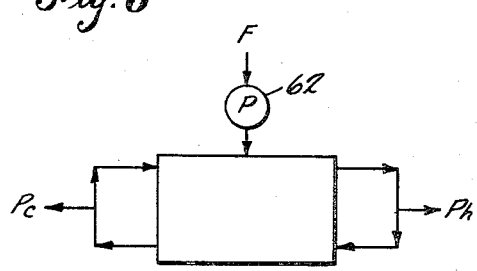
Fig. 8
Fig. 9
INVENTOR.
DAVID FRAZIER
BY
Leland L. Chapman
HIS ATTORNEY United States Patent Office 2,827,172
Patented Mar. 18, 1958

2,827,172

THERMAL DIFFUSION METHOD AND APPARATUS

David Frazier, Cleveland Heights, Ohio, assignor to The Standard Oil Company, Cleveland, Ohio, a corporation of Ohio Application June 20, 1956, Serial No. 592,663

19 Claims. (Cl. 210—72)

The present invention relates to novel thermal diffusion apparatus and to a method of concentrating one or more components in a fluid mixture by subjecting the fluid to thermal diffusion.

This application is a continuation-in-part of application Serial No. 404,101, filed January 14, 1954, and now abandoned.

The thermal diffusion of a fluid mixture, a term intended herein to include mixtures of liquids and mixtures of gases containing two or more components, as well as solutions that are liquid under operating conditions, consists essentially of confining the fluid in a narrow separation chamber defined primarily by two closely spaced walls and imposing a temperature gradient across the chamber by maintaining one of the walls at a higher temperature than the other. It has generally been found desirable to have the spacing or slit width between the opposed walls of a thermal diffusion separation chamber less than about 0.5 inch. For separating liquid mixtures, the spacing is preferably less than about 0.15 inch and, for optimum results, between about 0.02 and 0.06 inch or even less. In separating gaseous mixtures by thermal diffusion, the spacing between the opposed walls of the separation chamber is ordinarily somewhat greater, spacings of the order of about 0.2 to about 0.3 inch being generally preferred for optimum performance. One important reason for preferring narrow thermal diffusion separation chambers is that separation of liquids and gases by thermal diffusion increases with an increase in temperature gradient, the value of which is determined by the difference in temperature between the opposed walls, referred to herein generally as the "hot" or "relatively hot" wall and the "cold" or "relatively cold" wall, and the distance between them.

Generally, the apparatus of the invention comprises non-horizontal, i. e., vertical or tilted, walls having opposed surfaces substantially equidistantly spaced from one another to form a plurality of narrow separation zones having upper and lower ends. Means are provided for relatively heating and cooling opposed wall surfaces to maintain a temperature gradient across the separation zones between them. If the walls are tilted from the vertical plane it is usually desirable, for subjecting most fluids to separation by thermal diffusion, to relatively heat the upper wall and relatively cool the lower wall. The apparatus is provided with upper and lower reservoirs communicating with the upper and lower ends, respectively, of the separation zones and means are provided for continuously feeding the fluid to these reservoirs and withdrawing therefrom fluids containing different concentrations of components resulting from the admixture of fractions separated in the thermal diffusion separation zones with the fluids introduced into the reservoirs.

In accordance with one preferred embodiment of the apparatus of the invention, a finite series of separation zones is formed by sets of substantially vertical concentric tubes. The outer surface of the inner tube and the inner surface of the outer tube of each set of concentric tubes are spaced from one another substantially equidistantly to form an annular separation chamber and any desired means may be provided for relatively heating the inner or the outer tube and for relatively cooling the other so as to establish a temperature gradient across the annular chamber. The upper and lower ends of the annular separation chambers communicate with upper and lower reservoirs having appreciably greater cross sectional area available for the movement of fluid. Individual reservoirs are preferably provided for each annular chamber, each reservoir having sufficient volume to permit mixing of fluid entering from the separation chamber with fluid entering the separation zone and to avoid a turnabout of the fluid within the annular separation chamber before it reaches the reservoir. Generally, the width and height of such reservoirs should be at least twice, e. g., about ten times, the slit width of the annular chamber in order to effect these results. It is also feasible, however, to provide a common upper reservoir for communication with the upper ends of a series of chambers and a common lower reservoir for communication with the lower ends of the series of chambers.

When the fluid to be subjected to separation by thermal diffusion is a liquid and individual upper and lower reservoirs are provided for each separation chamber, it is most desirable to provide means, such as standpipes or the like, for compensating for differences in the average densities of the liquids in the various separation chambers and thereby avoid convective inter-chamber circulation that could, under some circumstances, nullify separations otherwise obtained.

In accordance with another embodiment of the invention, a thermal diffusion separation chamber, which in effect comprises an infinite number of incremental separation zones, is formed by two non-horizontal, plane walls, the opposed surfaces of which are spaced apart a substantially uniform distance and means are again provided for relatively heating and cooling the opposed wall surfaces. In this embodiment of the apparatus there are two reservoirs, preferably of cylindrical cross section. One reservoir communicates along substantially its entire length with the separation chamber at its upper end and the other along substantially its entire length with the chamber at its lower end. While the relation of cross sectional area of either reservoir in the length communicating with the chamber to the spacing of the chamber-forming wall surfaces is not particularly critical, it is desirably and preferably such that the pressure drop along the reservoirs is relatively low. The reservoirs should be large enough in cross section so that the flow of fluid through them does not substantially affect the convection flow in the separation chamber but not so large as to introduce an unduly high dilution effect and thereby reduce the effective separation obtainable. Preferably, the cross sectional area of the reservoirs should be at least about two to three times, e. g., about ten times, the spacing of the chamber-forming wall surfaces. At least one, and preferably both reservoirs are provided with means radially (as opposed to axially) mixing the fluid therein to insure admixture of concentrated fraction entering the reservoirs with the fluid therein.

The method of the invention generally comprises introducing or feeding the fluid to be subjected to separation by thermal diffusion to the upper and lower ends of the chambers, preferably by way of the upper and lower reservoirs, while maintaining a temperature gradient across the chambers. Fluid that is enriched in one component and ascends along the hot walls becomes admixed with a portion of the fluid entering the upper reservoir or reservoirs and another fraction having a higher concentration of another component that tends to accumulate adjacent the cold wall and descends into the lower reservoir or reservoirs becomes admixed with the feed. Separation is therefore achieved by continuously withdrawing from the mixture in the upper reservoir that contains a higher than initial concentration of one component and by withdrawing a mixture from the lower reservoir that contains a higher than initial concentration of another component or a lower than initial concentration of the first component.

In one preferred embodiment of the method of the invention utilizing the preferred apparatus comprising a series of annular thermal diffusion separation chambers each having individual upper and lower reservoirs, the fluid to be subjected to thermal diffusion is introduced into the upper reservoir for the first in the series of separation chambers and into the lower reservoir for the last in the series of separation chambers. The mixture in the upper reservoir for the first separation chamber is continuously transferred to the upper reservoir for the second chamber and so on until it is withdrawn from the upper reservoir for the last chamber. The fluid mixture in the lower reservoir for the last in the series of separation chambers is continuously transferred to the lower reservoir for the next to the last in the series of separation chambers and so on until it is withdrawn from the lower reservoir for the first in the series of separation chambers.

This flow pattern is referred to herein as the countercurrent, mixed end feed. It is to be understood that while this is the preferred flow pattern, the invention is not to be limited thereto but includes other flow patterns such as the concurrent, mixed end feed in which the fluid to be subjected to thermal diffusion is introduced into the upper and lower reservoirs for the first in the series of separation chambers, transferred separately from the upper and lower reservoirs for the first chamber to the upper and lower reservoirs for the second chamber and so on until the contents of the upper and lower reservoirs for the last chamber in the series are separately withdrawn.

In another embodiment in the method of the invention wherein the apparatus comprises a thermal diffusion separation chamber formed by opposed, plane wall surfaces, the fluid to be subjected to separation by thermal diffusion is preferably introduced into one end of the upper reservoir communicating along substantially its entire length with the upper end of the chamber so that the fluid will enter the chamber from said reservoir and advance through the reservoir in a given direction, simultaneously withdrawing from the same reservoir fluid enriched in one or more components thereof, feeding fluid into the lower reservoir likewise communicating along substantially its entire length with the lower end of the separation chamber and simultaneously withdrawing fluid enriched in one or more other components from the lower reservoir.

In the two embodiments of the method described, i. e., the method employing a finite number of annular separation zones or chambers formed by concentric tubes and the method employing an infinite number of separation zones formed by opposed, plane wall surfaces, the feed and movement of the fluid through the reservoirs is preferably countercurrent. The rate of feed or gross flow of fluid through the reservoirs is preferably low compared with the rate of thermal circulation due to convection within individual separation chambers.

It is believed that at least a substantial portion of the fluid fed into the reservoirs gradually enters the separation zones and while therein is caused to separate, by thermal diffusive forces, into a fraction tending to accumulate adjacent the hot wall and another fraction tending to accumulate adjacent the cold wall. Thermal convection induced by the temperature differences adjacent the hot and cold walls, respectively, causes the fraction accumulating adjacent the hot wall to ascend and enter or re-enter the upper reservoir or reservoirs for admixture with the resident or otherwise entering fluid. The fluid in the upper reservoir or series of reservoirs thereby becomes progressively more enriched with the ascending fraction as it advances through the apparatus. Similarly, the fraction accumulating adjacent the cold wall is caused to descend by thermal convection and enter or re-enter the lower reservoir or reservoirs for admixture with the resident or otherwise entering fluid for progessive enrichment thereof with the descending fraction.

The apparatus and method of the invention have a number of important advantages. One of these is that full advantage can be taken of the rapidity with which components separable by thermal diffusion actually accumulate adjacent the hot or cold walls. Another is that the separations obtainable are superior to those obtainable with static thermal diffusion methods. Perhaps the most surprising advantage of the preferred embodiment of the apparatus and method of the invention in which a finite number of annular separation chambers are employed is that under certain conditions of operation, readily ascertainable for a given set of conditions in the manner described hereinafter by way of example, the effect obtainable with a series of separation chambers is more than additive.

These and other advantages, as well as the utility of the apparatus and method of the invention, will be further demonstrated in the following detailed description made with reference to the accompanying drawing wherein:

Figure 2 is a view in elevation of another embodiment of the apparatus of the invention;

Figure 3 is a view in cross-section taken on section line 3—3 of Figure 2;

Figure 4 is a view similar to Figure 2 but with one of the plates or walls removed;

Figure 5 is a view similar to Figure 3 in which the walls and the separation chamber are shown in a tilted position; and Figures 6, 7, 8 and 9 are diagrammatic views illustrating several of the flow patterns that are possible with the apparatus illustrated in Figures 2 to 5.

Figure 1:
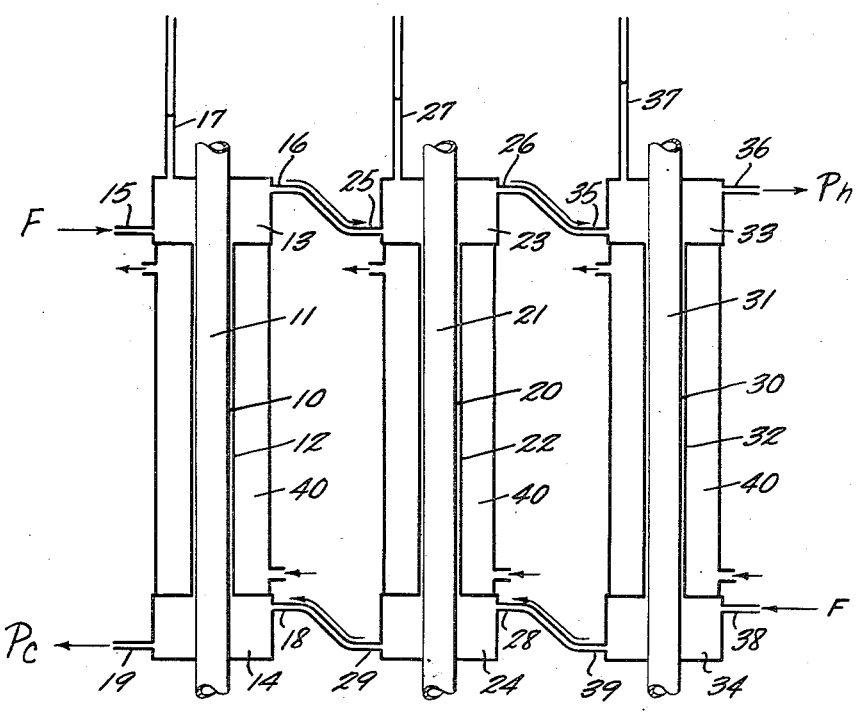
Figure 1 is a schematic view in elevation of a preferred embodiment of the apparatus of the invention.

Referring now to the drawing, the apparatus illustrated in Figure 1 consists essentially of a number of annular thermal diffusion separation chambers 10, 20 and 30 formed by concentric inner tubes 11, 21 and 31 and outer tubes 12, 22 and 32. The upper ends of the separation chambers communicate with upper reservoirs 13, 23 and 33 and the lower ends of the separation chambers communicate in a similar fashion with lower reservoirs 14, 24 and 34. Upper reservoirs 13, 23 and 33 are provided with feed connections 15, 25 and 35, withdrawal connections 16, 26 and 36 and standpipes 17, 27 and 37, the feed connections 25 and 35 being connected to withdrawal connections 16 and 26, respectively. The lower reservoirs 14, 24 and 34 are provided with inlet connections 18, 28 and 38 and with withdrawal connections 19, 29 and 39, the inlet connections 18 and 28 being connected to withdrawal connections 29 and 39, respectively. Each of the outer tubes is surrounded by a suitable cooling jacket 40 or equivalent means and a suitable source of heat may be located within or passed through the inner tubes 11, 21 and 31.

In the preferred method of operation of the apparatus illustrated in Figure 1, the fluid F is fed into the upper and lower reservoirs 13 and 34 by way of connections 15 and 38, respectively, while the inner and outer tubes forming the annular separation chambers 10, 20 and 30 are relatively heated and cooled or vice versa. The fractions that accumulate adjacent the hot walls ascend to the upper reservoirs, become mixed with the feed therein and are transferred to the next upper reservoir in the series until the feed enriched in that particular fraction, $P_h$, is withdrawn from the last upper reservoir by way of withdrawal connection 36. The fractions that accumulate adjacent the cold walls descend into the lower reservoirs and likewise become mixed with the fluid therein. This fluid, enriched with the fraction descending into the lower reservoir is passed into the next lower reservoir in the series until finally fluid that has been enriched with cold wall fraction, $P_c$, is withdrawn through withdrawal connection 19 of the first in the series of columns.

In one series of tests in 1, 2 and 3 columns, such as those illustrated in Figure 1, the height of each annular thermal diffusion chamber was 24 inches, the mean diameter was 0.632 inch, the spacing between the opposed wall surface was 0.020 inch, the inner tubes were heated with steam to a temperature of 312° F. and the outer tubes were maintained at a temperature of 90° F.

A solvent extract neutral oil obtained by furfural extraction of an oil from a Mid-Continent crude and having a viscosity of 140 SUS at 100° F. and a refractive index of 1.4730 was introduced into the apparatus in the manner indicated at various rates of feed and the degree of separation obtained was measured by measuring the index of refraction at 25° C. of the hot and cold wall products withdrawn from the upper and lower reservoirs, respectively. The results are tabulated immediately below:

Table I

| No. of Chambers | Feed Rate, cm.³/min. | Separation, $\Delta n_D^{25} \times 10^4$ |
|---|---|---|
| 1 | 0.479 | 46 |
|   | 1.034 | 20 |
|   | 1.965 | 15 |
|   | 2.747 | 10 |
| 2 | 0.470 | 75 |
|   | 0.989 | 46 |
|   | 1.395 | 33 |
|   | 2.00 | 24 |
|   | 2.90 | 16 |
| 3 | 0.763 | 77 |
|   | 1.08 | 58 |
|   | 1.36 | 47 |
|   | 1.584 | 40 |
|   | 2.12 | 32 |
|   | 2.946 | 24 |

This data shows surprisingly that at low flow rates and high separation levels considerably more than the expected separation is obtained as the number of columns is increased. This is illustrated by Table II immediately below showing that where the change in index of refraction is more than about 60, there is a substantial and unexpected improvement as high as 33% or higher. Thus, for example, where a given degree of separation is obtained with one column operated at a feed rate of 0.18 cm.³/min. and it might be expected that the same degree of separation could be obtained at three times (0.54 cm.³/min.) that feed rate with three columns, it has actually been found that the same degree of separation can be obtained with three columns in series at four times (0.72 cm.³/min.) said feed rate, i. e., with a 33% higher yield than cumulative expected yield.

Table II

| Separation, $\Delta n_D^{25} \times 10^4$ | Feed Rate, cm.³/min. | | | Percent Improvement Greater Than Additive | |
|---|---|---|---|---|---|
| | 1 column | 2 columns | 3 columns | 2 columns | 3 columns |
| 70 | 0.26 | 0.56 | 0.86 | 8 | 10 |
| 80 | 0.18 | 0.42 | 0.72 | 17 | 33 |

Calculations have shown that optimum results are obtainable with a series of from five to ten annular thermal diffusion separation chambers.

Referring now to the embodiment of the apparatus in which a thermal diffusion separation chamber, or in a sense an infinite number of thermal diffusion separation zones, is formed by plane wall members, Figures 2 to 5 schematically illustrate such apparatus consisting essentially of two wall members 50 and 51 spaced apart by a gasket, or the like, 52 to form a narrow separation chamber 54. One reservoir 56 is shown as communicating along substantially its entire length within the apparatus with the upper end of the separation chamber 54 and another reservoir 57 is shown as communicating along substantially its entire length within the apparatus with the lower end of the chamber 54. A coil or other suitable means for heating or cooling the wall 50 is shown in phantom at 59 in Figure 5 and similar or other means may be provided for cooling or heating the other wall 51. Rotatable area-mixing devices 60 and 61 are preferably provided in the reservoirs 56 and 57, respectively.

Figure 6 illustrates the preferred manner in which continuous separation by thermal diffusion is carried out with apparatus of this type. Means, such as a pump 62, are provided to introduce feed F into the upper reservoir 56, and similar means, indicated as a pump 64, are provided to introduce feed F, preferably of the same fluid, into the opposite end of the lower reservoir 57. The arrow labeled $P_h$ adjacent the upper right-hand corner in Figure 6 represents the withdrawal from the other end of the upper reservoir 56 of fluid enriched in one or more components that have preferentially accumulated adjacent the hot wall in the separation chamber and have ascended along that wall to enter or re-enter the reservoir 56. The arrow labeled $P_c$ adjacent the lower left-hand corner of Figure 6 represents fluid withdrawn from the left end of the lower reservoir 57, said fluid being enriched in one or more components that have preferentially accumulated adjacent the cold wall and descended by thermal convection to enter or re-enter the lower reservoir 57.

The flow pattern illustrated in Figure 7 differs from that illustrated in Figure 6 in that the directions of feed and product withdrawal into and from the reservoirs 56 and 57 are concurrent rather than countercurrent. In a manner somewhat similar to the method illustrated in Figure 6, the product $P_h$ represents fluid withdrawn from the right end of the upper reservoir 56 which is enriched in one or more components that have accumulated adjacent the hot wall, and product $P_c$ represents fluid withdrawn from the right end of the lower reservoir 57 which is enriched in one or more components that accumulate adjacent the cold wall.

The embodiment illustrated in Figure 8 includes a pump 62 or equivalent means for introducing the feed F into the upper reservoir 56, feeding a portion of the products $P_h$ into one end of the lower reservoir 57 and recycling a portion of the product $P_c$ to the upper reservoir 56. In this embodiment, separations of the highest degree are obtainable because the difference between the product $P_h$ and $P_c$ is not dependent upon the maximum theoretical at any given point along the length of the apparatus, but by the difference obtainable between the withdrawal ends of the upper and lower reservoirs. Thus, for example, since fluid introduced into the lower reservoir 57 of Figure 8 is enriched in the component that preferentially accumulates adjacent the hot wall, it follows that the product $P_h$ withdrawn from the same end of the upper resrvoir can be more concentrated in said component than if the fluid introduced into the lower reservoir were feed composition.

The embodiment illustrated in Figure 9 is substantially similar to that illustrated in Figure 6 except that a portion of the product $P_h$ is introduced, in place of the feed, into the opposite end of the lower reservoir. This embodiment is of particular advantage when it is desired to concentrate a component that is present in the initial fluid in relatively minor concentrations. While the flow pattern of Figure 9 is preferred for concentrating such a material that accumulates adjacent the hot wall, it is within the scope of the invention to reverse the flow pattern when it is desired to concentrate a component that tends to accumulate adjacent the cold wall.

It is to be expected that various modifications of the apparatus and method will suggest themselves to those skilled in the art upon reading this description. All such modifications are intended to be included within the scope of the invention as defined in the appended claims.

I claim:

1. Thermal diffusion apparatus for separating a fluid mixture into fractions enriched in dissimilar components which comprises substantially vertical walls having opposed surfaces substantially equidistantly spaced apart to form a series of thermal diffusion separation zones having upper and lower ends; means for relatively heating and cooling opposed wall surfaces to maintain a temperature gradient across each separation zone; (a) first reservoir means forming the first series of interconnected mixing zones each having dimensions greater than the distance between said vertical walls and each communicating with the upper end of one of said series of separation zones, means for continuously introducing said fluid mixture into said first reservoir means at the first member of said first series of mixing zones, means for continuously withdrawing fluid from said first reservoir means at the last member of first series of mixing zones; (b) second reservoir means forming a second series of interconnected mixing zones each having dimensions greater than the distance between said vertical walls and each communicating with the lower end of one of said series of separation zones, means for continuously introducing said fluid mixture into said second reservoir means at the first member of said second series of mixing zones, means for continuously withdrawing fluid from said second reservoir means at the last member of said second series of mixing zones.

2. Thermal diffusion apparatus for separating a fluid mixture into fractions enriched in dissimilar components which comprises vertical walls having opposed surfaces substantially equidistantly spaced apart to form a series of thermal diffusion separation chambers each having upper and lower ends; means for relatively heating and cooling opposed wall surfaces to maintain a temperature gradient across each separation chamber; a series of upper reservoirs having dimensions greater than the distance between said vertical walls, one associated with each chamber, each upper reservoir communicating with the upper end of its associated separation chamber for continuously receiving fluid mixture, mixing it with a fraction from its associated separation chamber having a higher than initial concentration of one of said dissimilar components, introducing a portion of the fluid mixture into its associated separation chamber, and continuously discharging the remainder of the fluid mixture enriched in said one of said dissimilar components; a series of lower reservoirs having dimensions greater than the distance between said vertical walls, one associated with each chamber, each lower reservoir communicating with the lower end of its associated separation chamber for continuously receiving fluid mixture, mixing it with a fraction from its associated separation chamber having a higher than initial concentration of another of said dissimilar components, introducing a portion of the fluid mixture into its associated separation chamber, and continuously discharging the remainder of the fluid mixture enriched in said another of said dissimilar components.

3. Thermal diffusion apparatus as defined in claim 2 wherein the separation chamber-forming walls are concentric.

4. Thermal diffusion apparatus as defined in claim 2 wherein the upper reservoirs are provided with means for compensating for differences in the average densities of the fluids within the chambers of the series.

5. Thermal diffusion apparatus comprising two substantially vertical, substantially parallel walls having opposed surfaces substantially equidistantly spaced from one another to form a narrow separation chamber having upper and lower ends, means for relatively heating and cooling the wall surfaces to maintain a temperature gradient across the chamber, a first reservoir having dimensions greater than the distance between said parallel walls communicating along substantially its entire length with the chamber at its upper end, and a second reservoir having dimensions greater than the distance between said parallel walls communicating along substantially its entire length with the chamber at its lower end and means for introducing liquid to be separated at one end of each of said reservoirs and withdrawing separated liquid from the other end of each of said reservoirs whereby the liquid in said reservoirs becomes progressively separated.

6. Thermal diffusion apparatus comprising two vertical, substantially parallel walls having opposed surfaces substantially equidistantly spaced from one another to form a narrow separation chamber having upper and lower ends, means for relatively heating and cooling the wall surfaces to maintain a temperature gradient across the chamber, a first reservoir having dimensions greater than the distance between said parallel walls communicating along substantially its entire length with the chamber at its upper end, a second reservoir having dimensions greater than the distance between said parallel walls communicating along substantially its entire length with the chamber at its lower end, radial mixing means in at least one of the first and second reservoirs, and means for introducing liquid to be separated at one end of each of said reservoirs and withdrawing liquid from the other end of each of said reservoirs.

7. Thermal diffusion apparatus comprising two inclined, substantially parallel walls having opposed surfaces substantially equidistantly spaced from one another to form a narrow separation chamber having upper and lower ends, means for relatively heating and cooling the wall surfaces to maintain a temperature gradient across the chamber, a first reservoir having dimensions greater than the distance between said parallel walls communicating along substantially its entire length with the chamber at its upper end, a second reservoir having dimensions greater than the distance between said parallel walls communicating along substantially its entire length with the chamber at its lower end, radial mixing means in at least one of the first and second reservoirs and means for introducing liquid to be separated at one end of each of said reservoirs and withdrawing liquid from the other end of each of said reservoirs.

8. Thermal diffusion apparatus comprising two substantially vertical, substantially parallel walls having opposed surfaces substantially equidistantly spaced from one another to form a narrow separation chamber having upper and lower ends, means for relatively heating and cooling the wall surfaces to maintain a temperature gradient across the chamber, a first reservoir communicating along substantially its entire length with the chamber at its upper end, a second reservoir communicating along substantially its entire length with the chamber at its lower end, the first and second reservoirs being substantially cylindrical and having a diameter at least about twice the spacing between the separation chamber-forming wall surfaces of the parallel walls, radial mixing means in the reservoirs and means for introducing liquid to be separated at one end of each of said reservoirs and withdrawing liquid from the other end of each of said reservoirs.

9. Thermal diffusion apparatus comprising two substantially vertical, substantially parallel walls having opposed surfaces substantially equidistantly spaced from one another to form a narrow separation chamber having upper and lower ends, means for relatively heating and cooling the wall surfaces to maintain a temperature gradient across the chamber, a first reservoir communicating along substantially its entire length with the chamber at its upper end, a second reservoir communicating along substantially its entire length with the chamber at its lower end, the first and second reservoirs being substantially cylindrical and having a diameter about ten times the spacing between the separation chamber-forming wall surfaces of the parallel walls, radial mixing means in the reservoirs and means for introducing liquid to be separated at one end of each of said reservoirs and withdrawing liquid from the other end of each of said reservoirs.

10. Thermal diffusion apparatus comprising two substantially vertical, substantially parallel walls having opposed surfaces substantially equidistantly spaced from one another to form a narrow separation chamber having upper and lower ends, means for relatively heating and cooling the wall surfaces to maintain a temperature gradient across the chamber, a first reservoir having dimensions greater than the distance between said parallel walls communicating along substantially its entire length with the chamber at its upper end, a second reservoir having dimensions greater than the distance between said parallel walls communicating along substantially its entire length with the chamber at its lower end, means for continuously introducing a liquid into one end of the first reservoir and the opposite end of the second reservoir and means for continuously withdrawing enriched liquid from said first and second reservoirs at the ends remote from the ends for introducing the liquid.

11. Thermal diffusion apparatus comprising two substantially vertical walls having opposed surfaces substantially equidistantly spaced from one another to form a narrow separation chamber having upper and lower ends, means for relatively heating and cooling the wall surfaces to maintain a temperature gradient across the chamber, a first reservoir having dimensions greater than the distance between said vertical walls communicating along substantially its entire length with the chamber at its upper end, a second reservoir having dimensions greater than the distance between said vertical walls communicating along substantially its entire length with the chamber at its lower end, means for continuously introducing a liquid into the same ends of the first and second reservoirs and means for continuously withdrawing enriched liquid from the opposite ends of the first and second reservoirs.

12. Thermal diffusion apparatus comprising two substantially vertical walls having opposed surfaces substantially equidistantly spaced from one another to form a narrow separation chamber having upper and lower ends, means for relatively heating and cooling the wall surfaces to maintain a temperature gradient across the chamber, a first reservoir having dimensions greater than the distance between said vertical walls communicating along substantially its entire length with the chamber at its upper end, a second reservoir having dimensions greater than the distance between said vertical walls communicating along substantially its entire length with the chamber at its lower end, means for introducing a liquid into one of the first and second reservoirs, means for withdrawing liquid from one end of said one reservoir, means for introducing a portion of the withdrawn liquid into one end of the other of said first and second reservoirs, means for withdrawing liquid from the other end of said other reservoir, and means for reintroducing a portion of said last withdrawn liquid into said one of the first and second reservoirs.

13. Process for continuously separating a fluid mixture into fractions enriched with dissimilar components which comprises imposing a temperature gradient across a plurality of separation zones defined by opposed, substantially vertical surfaces substantially equidistantly spaced apart and communicating at their upper and lower ends with reservoirs having dimensions greater than the distance between said vertical surfaces and containing a series of mixing zones; continuously introducing fluid mixture containing said dissimilar components into first member of said series of mixing zones in said upper and lower reservoirs, whereby the separation zones are filled with fluid mixture for separation into ascending fractions containing higher than initial concentrations of one of the dissimilar components and descending fractions containing higher than initial concentrations of another of said dissimilar components; admixing introduced fluid in said upper and lower reservoirs with the ascending and descending fractions entering said reservoirs from the separation zones; and continuously and separately withdrawing fractions enriched with dissimilar components by admixture with said ascending and descending fractions from a member of said series of mixing zones removed from the said place of introduction of said fluid mixture in said upper and lower reservoirs, respectively.

14. Process for continuously separating a fluid mixture into fractions enriched with dissimilar components which comprises imposing a temperature gradient across a plurality of annular separation chambers defined by vertical, concentric tubes, said annular chambers communicating at their upper and lower ends with reservoirs having dimensions greater than the distance between said vertical concentric tubes and containing a series of mixing zones; continuously introducing fluid mixture containing said dissimilar components into a first member of said series of mixing zones in said upper and lower reservoirs, whereby the separation chambers are filled with fluid mixture for separation into ascending fractions containing higher than initial concentrations of one of the dissimilar components and descending fractions containing higher than initial concentrations of another of said dissimilar components; admixing introduced fluid in said upper and lower reservoirs with the ascending and descending fractions entering said reservoirs from the separation chambers, and continuously and separately withdrawing fractions enriched with dissimilar components by admixture with said ascending and descending fractions from a member of said series of mixing zones removed from said first member in said upper and lower reservoirs, respectively.

15. Process for continuously separating a fluid mixture into fractions enriched with dissimilar components which comprises imposing a temperature gradient across each of a series of annular separation chambers defined by vertical concentric tubes, each annular chamber communicating at its upper and lower ends with associated individual reservoirs having dimensions greater than the distance between said concentric tubes for fluid and the upper and lower reservoir for each annular chamber communicatnig with the upper and lower reservoir, respectively, for the next adjacent annular chamber in the series; continuously introducing fresh fluid mixture containing said dissimilar components into the upper reservoir for the first in the series of separation chambers and into the lower reservoir for one of the first and the last in the series of separation chambers, whereby the separation chambers and reservoirs are filled with fluid mixture for separation into ascending fractions containing higher than initial concentrations of one of the dissimilar components and descending fractions containing higher than initial concentrations of another of said dissimilar components; admixing introduced fluid in said upper and lower reservoirs with the ascending and descending fractions entering associated reservoirs from their respective annular chambers; and continuously and separately withdrawing fractions enriched with dissimilar components by admixture with said ascending and descending fractions from the upper reservoir for the last in the series of annular chambers and from the lower reservoir for the other of said first and last in the series of annular chambers.

16. Process for continuously concentrating one or more components in a fluid by thermal diffusion which comprises feeding the fluid into a first reservoir communicating along substantially its entire length with one of the upper and lower ends of a narrow, substantially vertical thermal diffusion separation chamber for entry into said chamber, maintaining a temperature gradient across the chamber, and continuously withdrawing fluid enriched in one component from said one of said upper and lower ends of the chamber through said first reservoir, whereby the fluid becomes enriched in said one component as it advancs through said first reservoir, and continuously feeding fluid into one end of a second reservoir communicating along substantially its entire length with the other of the upper and lower ends of the separation chamber for entry into said chamber and continuously withdrawing fluid enriched in another component from said other of said upper and lower ends of the chamber through said second reservoir, said first and second reservoirs having dimensions greater than the width of said separation chambers, whereby said fluid becomes enriched in said other component as it advances through said second reservoir from the feed end thereof.

17. Process for continuously concentrating one or more components in a liquid by thermal diffusion which comprises feeding the liquid into a first reservoir communicating along substantially its entire length with one of the upper and lower ends of a narrow, substantially vertical thermal diffusion separation chamber for entry into said chamber, maintaining a temperature gradient across the chamber, radially admixing the liquid in said first reservoir, and continuously withdrawing liquid enriched in one component from said one of said upper and lower ends of the chamber through said first reservoir, whereby the liquid becomes enriched in said one component as it advances through said first reservoir, and continuously feeding liquid into one end of a second reservoir communicating along substantially its entire length with the other of the upper and lower ends of the separation chamber for entry into said chamber, radially admixing the liquid in said second reservoir, and continuously withdrawing liquid enriched in another component from said other of said upper and lower ends of the chamber through said second reservoir, said first and second reservoirs having dimensions greater than the width of said separation chamber, whereby said liquid becomes enriched in said other component as it advances through said second reservoir from the feed end thereof.

18. Process for concentrating one or more components in a liquid by thermal diffusion which comprises feeding the liquid into one end of a first reservoir communicating along substantially its entire length with one of the upper and lower ends of a narrow, substantially vertical thermal diffusion separation chamber for entry into said chamber, maintaining a temperature gradient across the chamber, and withdrawing liquid enriched in one component from said one of said upper and lower ends of the chamber through said first reservoir, whereby the liquid becomes enriched in said one component as it advances through said first reservoir from the feed end thereof, and feeding the liquid into one end of a second reservoir communicating along substantially its entire length with the other of the upper and lower ends of the separation chamber for entry into said chamber and withdrawing liquid enriched in another component from said other of said upper and lower ends of the chamber through said second reservoir, said first and second reservoirs having dimensions greater than said separation chamber whereby the liquid becomes enriched in said other component as it advances through said second reservoir from the feed end thereof, the direction of feed into the first and second reservoirs being countercurrent relative to one another.

19. Process for concentrating one or more components in a liquid by thermal diffusion which comprises feeding the liquid into one end of a first reservoir communicating along substantially its entire length with one of the upper and lower ends of a narrow, substantially vertical thermal diffusion separation chamber for entry into said chamber, maintaining a temperature gradient across the chamber, and simultaneously withdrawing liquid enriched in one component from said one of said upper and lower ends of the chamber through said first reservoir, whereby the liquid becomes enriched in said one component as it advances through said first reservoir from the feed end thereof, and feeding the liquid into one end of a second reservoir communicating along substantially its entire length with the other of the upper and lower ends of the separation chamber for entry into said chamber and withdrawing liquid enriched in another component from said other of said upper and lower ends of the chamber through said second reservoir, said first and second reservoirs having dimensions greater than the width of said separation chamber whereby the liquid becomes enriched in said other component as it advances through said second reservoir from the feed end thereof, the direction of feed into said first and second reservoirs being concurrent.

References Cited in the file of this patent

UNITED STATES PATENTS 2,751,082     Gary _____ June 19, 1956
2,767,850     Marsh _____ Oct. 23, 1956